(12) United States Patent
Lewis et al.

(10) Patent No.: US 11,494,392 B2
(45) Date of Patent: Nov. 8, 2022

(54) TRACKING ENTITY ACTIVITY USING COMPUTER GENERATION OF VALUES FOR BLOCKCHAIN NETWORK ENTRIES

(71) Applicant: International Business Machines Corporation, Armonk, NY (US)

(72) Inventors: Anil Lewis, Scarborough (CA); Andrei Saikouski, Toronto (CA); Joseph Kim, Toronto (CA); Ally Karmali, Toronto (CA); Charbel Safadi, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 17/125,909

(22) Filed: Dec. 17, 2020

(65) Prior Publication Data
US 2022/0197913 A1    Jun. 23, 2022

(51) Int. Cl.
*G06F 16/2455* (2019.01)
*G06F 16/27* (2019.01)
(Continued)

(52) U.S. Cl.
CPC .... *G06F 16/24578* (2019.01); *G06F 16/2255* (2019.01); *G06F 16/2455* (2019.01); *G06F 16/27* (2019.01)

(58) Field of Classification Search
CPC .................................................. G06F 16/2255
See application file for complete search history.

(56) References Cited

U.S. PATENT DOCUMENTS 5,819,291 A    10/1998  Haimowitz
5,960,430 A     9/1999  Haimowitz
(Continued)

OTHER PUBLICATIONS

"Distributed Match link for a business network in the decentralized digital ledger technology (DLT)", An IP.com Prior Art Database Technical Disclosure, Disclosed Anonymously, IP.com No. IPCOM000256030D, IP.com Electronic Publication Date: Oct. 31, 2018, 6 pages, <https://priorart.ip.com/IPCOM/000256030>.

(Continued)

*Primary Examiner* — Robert W Beausoliel, Jr.
*Assistant Examiner* — Pedro J Santos
(74) *Attorney, Agent, or Firm* — Michael A. Petrocelli

(57) ABSTRACT

A computer analyzes blockchain ledger content. The computer receives a set of attributes associated with a predetermined entity and applies a one-way function to the attributes, generating an inquiry hash. The computer receives access to a blockchain ledger that includes a report with at least one report hash associated with an attribute of a report entity. The computer searches the report using the inquiry hash as a search key. The computer generates a list of candidate reports containing hashes that matches the inquiry hash. The computer assigns an entity matching confidence rating to candidate reports based, at least in part, on a predetermined identification utility value associated with each inquiry hash matched. The identification utility value indicates a likelihood that the report entity is the predetermined entity. The computer generates a list of high assurance reports having entity matching confidence ratings above a predetermined assurance threshold.

20 Claims, 7 Drawing Sheets

(51) Int. Cl.
*G06F 16/2457* (2019.01)
*G06F 16/22* (2019.01)

(56) References Cited

U.S. PATENT DOCUMENTS

| | | |
|---|---|---|
| 7,809,701 B2 | 10/2010 | Blake |
| 8,538,013 B2 | 9/2013 | Thorbjornsson |
| 9,520,999 B2 | 12/2016 | Klevan |
| 10,411,895 B2 | 9/2019 | Curbera |
| 10,740,216 B1 * | 8/2020 | Parent .................... G06N 20/20 |
| 2010/0064042 A1 | 3/2010 | Paster |
| 2017/0048216 A1 | 2/2017 | Chow |
| 2018/0260888 A1 | 9/2018 | Paolini-Subramanya |
| 2019/0303942 A1 * | 10/2019 | Balaraman ............ H04L 9/3239 |
| 2020/0211054 A1 * | 7/2020 | Garg .................. G06Q 30/0248 |
| 2021/0233192 A1 * | 7/2021 | Manamohan ....... G06F 16/2255 |
| 2021/0312089 A1 * | 10/2021 | Liu ........................ G06F 21/602 |
| 2022/0083507 A1 * | 3/2022 | Crowell ................ G06F 16/137 |
| 2022/0092079 A1 * | 3/2022 | Casey .................. G06F 16/215 |

OTHER PUBLICATIONS

Battistini, Dominick J., "Using Blockchain Technology to Facilitate Anti-Money Laundering Efforts", Economic Crime Forensics Capstones, La Salle University, Summer Aug. 31, 2016, 27 pages.
Mell, et al., "The NIST Definition of Cloud Computing", National Institute of Standards and Technology, Special Publication 800-145, Sep. 2011, 7 pages.
Middleton, Ryan, "Using blockchain for KYC/AML compliance", Dentons—JDSupra, May 30, 2019, 11 pages, <https://www.jdsupra.com/legalnews/using-blockchain-for-kyc-aml-compliance-25325/>.

* cited by examiner

| 602 | 604 | 604 | 606 | 608 |
|---|---|---|---|---|
| Report ID | Report Source | Report Time | Activity Being Reported | Predetermined Combination of Attributes hashed together and included in Report (e.g., Report Hashes) |
| 1 | Source 1 | Time 1 | Activity 1 | Predetermined Attribute Combination 1 |
| | | | | Predetermined Attribute Combination 2 |
| | | | | Predetermined Attribute Combination 3 |
| 2 | Source 1 | Time 2 | Activity 2 | Predetermined Attribute Combination 1 |
| | | | | Predetermined Attribute Combination 3 |
| 3 | Source 2 | Time 3 | Activity 3 | Predetermined Attribute Combination 1 |

| 702 | 402 | 120 |
|---|---|---|
| Inquiring Entity ID | Attribute Combination ID | Attribute Combination Identification Utility Value (IUV) |
| 1 | 1 | Value 1 |
| | 2 | Value 2 |
| | 3 | Value 3 |
| | 4 | Value 4 |
| | 5 | Value 5 |
| 2 | 1 | Value 1 |
| | 2 | Value 2 |
| | 3 | Value 4 |
| | 2 | Value 5 |
| | 5 | Value 3 |

TRACKING ENTITY ACTIVITY USING COMPUTER GENERATION OF VALUES FOR BLOCKCHAIN NETWORK ENTRIES

BACKGROUND

The present invention relates to the field of computer data exchange including the storage and retrieval of information within a blockchain network.

Electronic records containing information about the activity of various entities can be stored by many different organizations. In some cases, records identify behavior that is relevant to the organizations besides the one which collected the information. Unfortunately, sharing records among organizations can be problematic, because this information is often indexed by entity attributes that are not sharable. In these scenarios, it is difficult for organizations to share information about transactions with particular entities, because providing and even requesting information about entity behavior can involve a prohibited exchange of protected details. As a result, an entity may undertake unwanted behavior (e.g., such as attempting to complete an unwanted transaction) with a given organization. In one example, the organization may have difficulty notifying other organizations about the behavior.

SUMMARY

In embodiments according to the present invention, a computer implemented method to analyze blockchain ledger content includes receiving, by a computer, a set of attributes associated with a predetermined entity. The computer, in response to receiving the set of attributes, the computer applies a one-way function to a group of said attributes to generate an inquiry hash. The computer receives access to a blockchain ledger that includes at least one report, said at least one report including at least one report hash associated with an attribute of a report entity. The computer searches the at least one report using the inquiry hash as a search key. In response to the searching, the computer generates a list of candidate reports that each contain at least one report hash that matches said inquiry hash. The computer assigns an entity matching confidence rating to each of said candidate reports based, at least in part, on a predetermined identification utility value associated with said inquiry hash, said identification utility value indicating a likelihood that the report entity is the predetermined entity. The computer generates from among rated candidate reports, a list of high assurance reports having an entity matching confidence rating above a predetermined assurance threshold.

According to aspects of the invention, for each of the candidate reports being assigned an entity matching confidence rating having a value less than the predetermined assurance threshold, obtaining by the computer from an information source, additional information about an associated report entity; and generating a list of said additional information associated with said report entity.

According to aspects of the invention, the inquiry hash is generated from applying said one-way function to a plurality of attributes.

According to aspects of the invention, the at least one report includes a plurality of report hashes.

According to aspects of the invention, the computer applies the one-way function to a plurality of groups of said attributes to generate a corresponding plurality of inquiry hashes, and wherein said searching is conducted using each of said inquiry hashes as a search key.

According to aspects of the invention, the inquiry hashes are made by a first entity, and said reports are generated by a second entity.

According to aspects of the invention, the blockchain is a private, permissioned network.

According to aspects of the invention, the entity is an individual.

In another embodiment of the invention, a system to analyze blockchain ledger content comprises: a computer system comprising a computer readable storage medium having program instructions embodied therewith, the program instructions executable by a computer to cause the computer to: receive a set of attributes associated with a predetermined entity; responsive to receiving said set of attributes, apply a one-way function to a group of said attributes to generate an inquiry hash; receive access to a blockchain ledger that includes at least one report, said at least one report including at least one report hash associated with an attribute of a report entity; search the at least one report using said inquiry hash as a search key; responsive to said searching, generate a list of candidate reports that each contain at least one report hash that matches said inquiry hash; assign an entity matching confidence rating to each of said candidate reports based, at least in part, on a predetermined identification utility value associated with each inquiry hash matched, said identification utility value indicating a likelihood that the report entity is the predetermined entity; and generate from among rated candidate reports, a list of high assurance reports having an entity matching confidence rating above a predetermined assurance threshold.

In another embodiment of the invention, a computer program product to analyze blockchain ledger content, the program instructions executable by a computer to cause the computer to: receive, using a computer, a set of attributes associated with a predetermined entity; responsive to receiving said set of attributes, apply, using the computer, a one-way function to a group of said attributes to generate, using the computer, an inquiry hash; receive, using the computer, access to a blockchain ledger that includes at least one report, said at least one report including at least one report hash associated with an attribute of a report entity; search, using the computer, the at least one report using said inquiry hash as a search key; responsive to said searching, generate, using the computer, a list of candidate reports that each contain at least one report hash that matches said inquiry hash; assign an entity matching confidence rating to each of said candidate reports based, at least in part, on a predetermined identification utility value associated with each inquiry hash matched, said identification utility value indicating a likelihood that the report entity is the predetermined entity; and generating from among rated candidate reports, a list of high assurance reports having an entity matching confidence rating above a predetermined assurance threshold.

The present disclosure recognizes and addresses the shortcomings and problems associated with searching for information about suspicious or otherwise unwanted behavior of an entity in a ledger indexed by restricted access data.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as:

FIG. 6 is a table schematically representing aspects of a distributed ledger, implemented using the system shown in FIG. 1, to store and find information about entity behavior using a blockchain network according to aspects of the invention.

FIG. 7 is a table schematically representing information related to exemplary ledger hash identification utility values of two inquiring entities, implemented using the system shown in FIG. 1, to store and find information about entity behavior using a blockchain network according to aspects of the invention.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
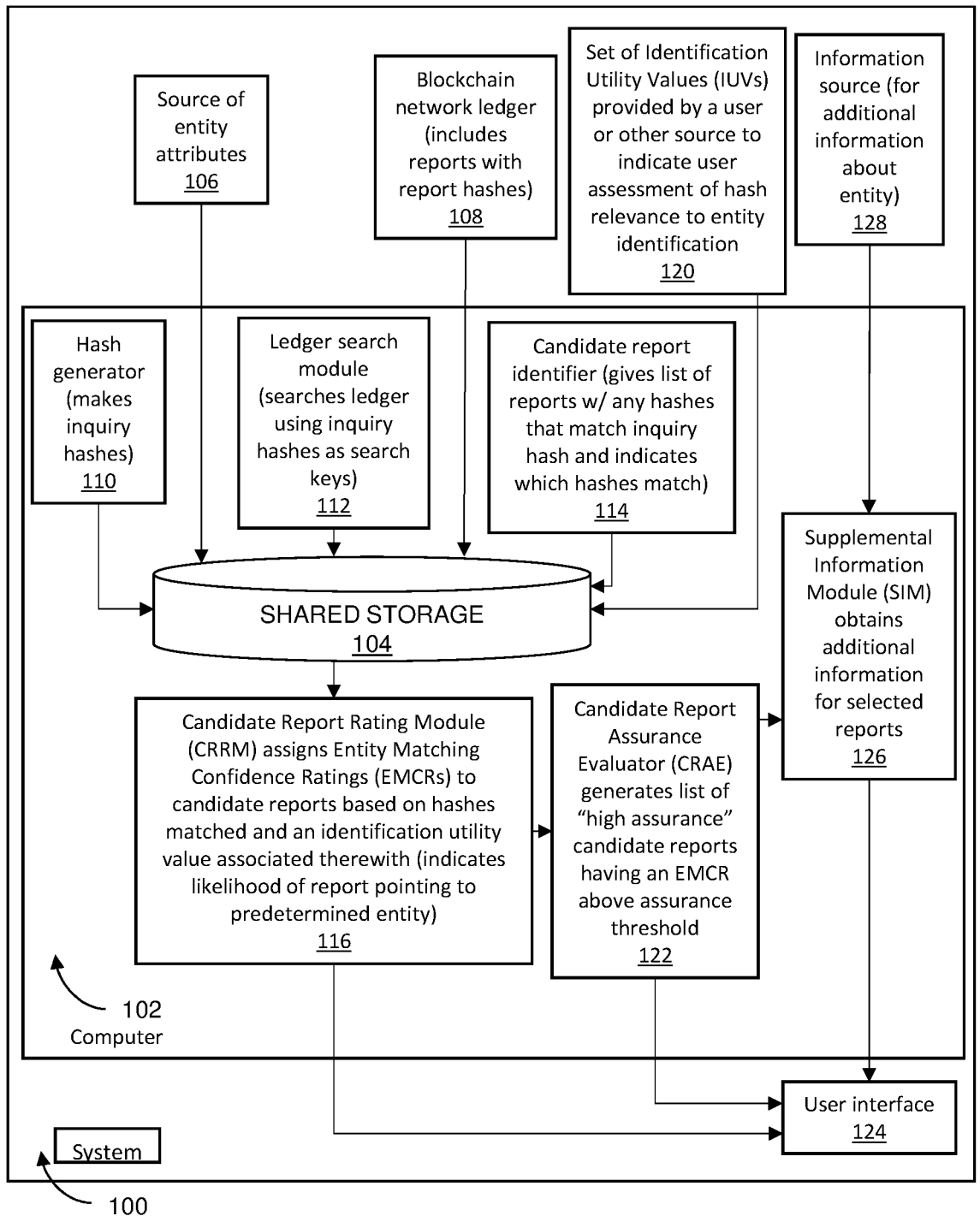
FIG. 1 is a schematic block diagram illustrating an overview of a system to store and find information about entity behavior using a blockchain network according to embodiments of the present invention.
Figure 2:
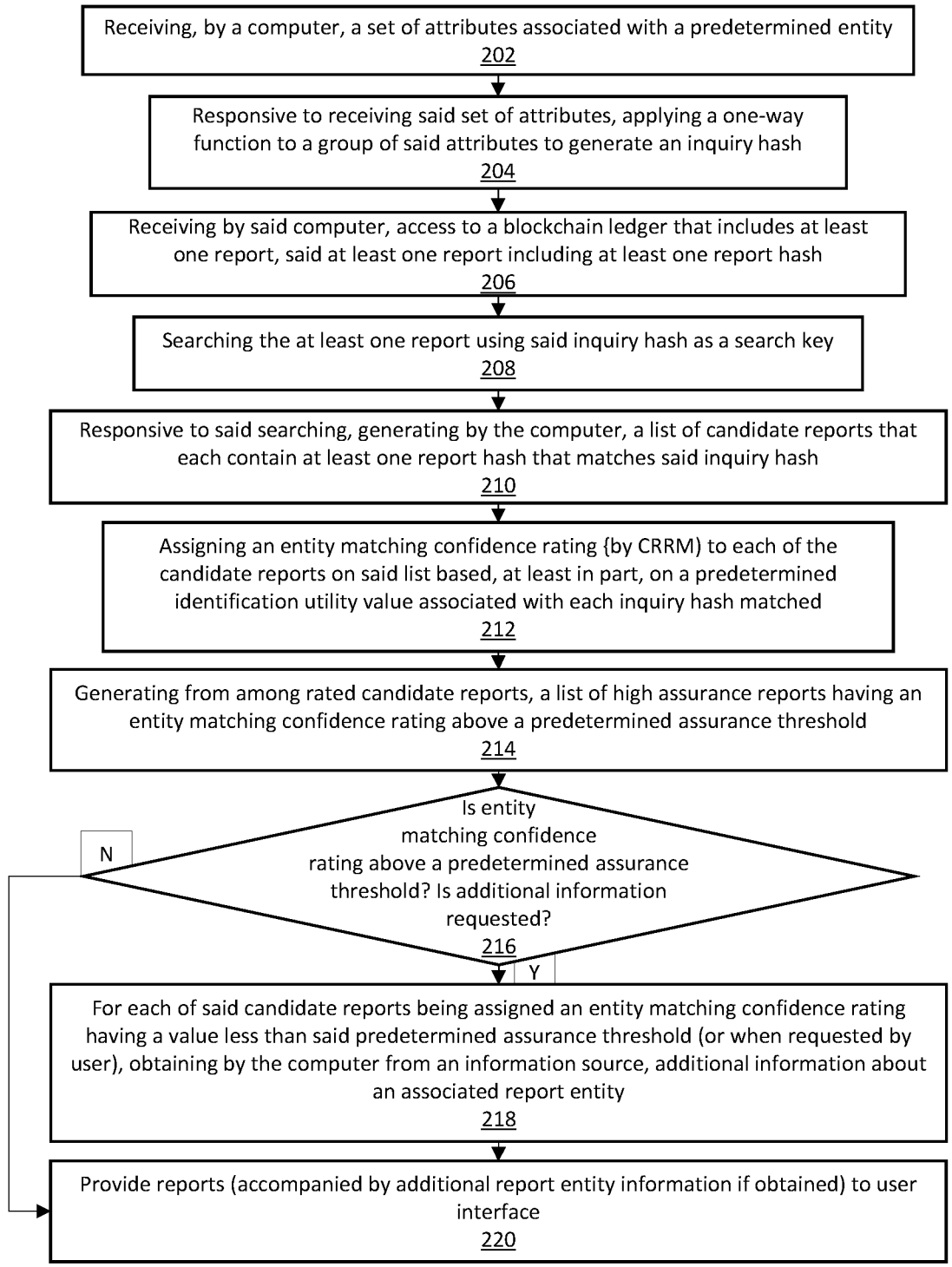
FIG. 2 is a flowchart illustrating a method, implemented using the system shown in FIG. 1, to store and find information about entity behavior using a blockchain network according to aspects of the invention.
Figure 3:
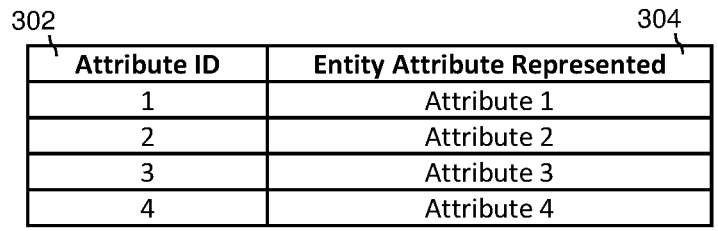
FIG. 3 is a table schematically representing entity attributes to be represented by cryptographic hashes in a method implemented using the system shown in FIG. 1, to store and find information about entity behavior using a blockchain network according to aspects of the invention.

Now with combined reference to the Figures generally and with particular reference to FIG. 1 and FIG. 2, an overview of a method to store and find information about entity behavior using a blockchain network usable within a system 100 as carried out by a server computer 102 having optionally shared storage 104, according to an embodiment of the present disclosure is shown. The server computer 102 is in communication with a source of entity attributes 106 and receives a set of attributes 304 (shown schematically, for example, in table 300 of FIG. 3) that provide various pieces of information for a predetermined entity (e.g., an individual about which a user may conduct an inquiry lookup). As shown with continued reference to FIG. 3, each of the attributes 304 is uniquely identified by an attribute number 302. Collectively, these attributes 304 can represent a wide range of information about a given entity. For example, the attributes 304 may include data describing commercial activity of a certain entity (e.g., transaction history, purchase preferences, and other commercially-relevant details). The attributes 304 may also include various pieces of demographic information (e.g., entity income, location of residence, voting registration details, and so on). In some cases, the information may directly identify the entity (e.g., name, date of birth, various government-issued identification numbers, and the like). According to aspects of the invention, regardless of which attributes 304 are received by the server computer 102, no attribute content is redistributed or otherwise shared once received by the user.

The server computer 102 has access to blockchain network 108. According to aspects of the invention, the blockchain network 108 is a distributed ledger that includes transaction record reports arranged in a sequential chain of cryptographically-hashed blocks (e.g., hashes). Hashes are fixed-length data blocks typically generated by a computer (e.g., server computer 102) using a one-way mathematical function (e.g., a cryptographic hashing function) applied to input. Of particular relevance to aspects of the present invention, hashes made by different parties using the same input and hashing function will be identical. This allows generation of uniform, consistently-transformed versions of input data (e.g., for example, entity attributes) by multiple parties. Reports containing hashes generated using the same input data (e.g., a report based entity attributes) can be placed into the blockchain ledger by a first party and found by a second party with a search inquiry that uses a hash made from the same input (e.g., the same entity attribute) as that used to generate the report. When both parties apply the same one-way function to identical input data, the report hash and inquiry hash will match. According to aspects of the invention, the second party (an inquiring user) can find the searched-for input within the ledger, and the input data content is never shared between the parties. Because the hash cannot be unscrambled, even when the one-way function is known, the entity attributes known and used by each party (e.g., to generate reports with hash content and inquiry search key hashes) are never transferred and remain secure.

The content of the hashes, themselves, can be compared, however, and a match of two hashes indicates that the same input was used by each hash-generating party.

According to aspects of the invention, the blocks of the blockchain ledger 108 contain hashes that are each associated with attributes 304 (or combinations of attributes) of report entities. According to aspects of the invention, report entities are parties (e.g., groups or individuals) about which an activity report described more fully below (aspects of which are shown schematically, for example, in table 600 of FIG. 6) has been entered into the blockchain network ledger 108. Users may search the network ledger to find information regarding the activity (or, when information is absent, a lack of activity) attributed to a given report entity. According to aspects of the invention, the blockchain ledger is a permissioned blockchain (e.g., private, consortium, similar non-public blockchain).

Figure 4:
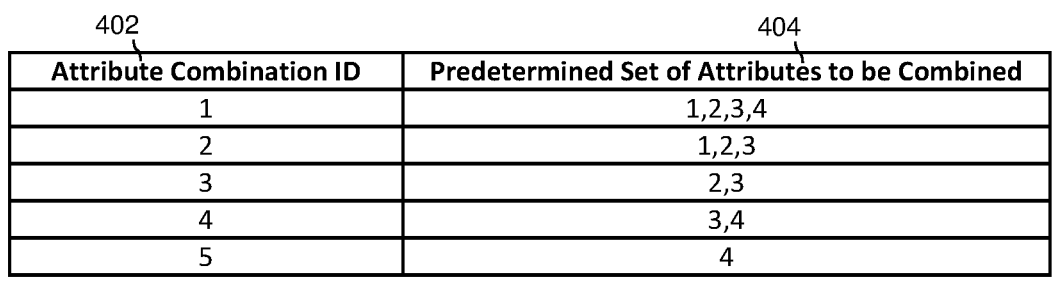
FIG. 4 is a table that schematically represents predetermined attribute groupings available for use as input during generation of hashes in a method implemented using the system shown in FIG. 1, to store and find information about entity behavior using a blockchain network according to aspects of the invention.

According to aspects of the invention, a predetermined set of attribute combinations 400 (aspects of which are shown schematically, for example, in FIG. 4) is established for use within the blockchain ledger 108. As shown with continued reference to FIG. 4, each of the predetermined attribute combinations 400 is identified by an attribute combination ID 402 and represents a bundle 404 of entity attributes 304 to be combined and hashed into a single output by the hash generator 110 described more fully below. It is noted that, in some cases, an attribute combination ID 402 may represent a single entity attribute. Each report entry in the blockchain leger 108 contains one (or more) report hashes (e.g., combination of attributes combined and hashed) 608 each representing one of the predetermined attribute combinations 400 that, in turn, represents a group 404 of entity attributes 304 associated with the entity associated with the report (e.g., the report entity). Although other distributed ledger arrangements could also be used, the cryptographic nature of blockchain network elements makes this arrangement particularly appropriate for environments where redistribution of received entity attribute data 304 is restricted.

Figure 5:
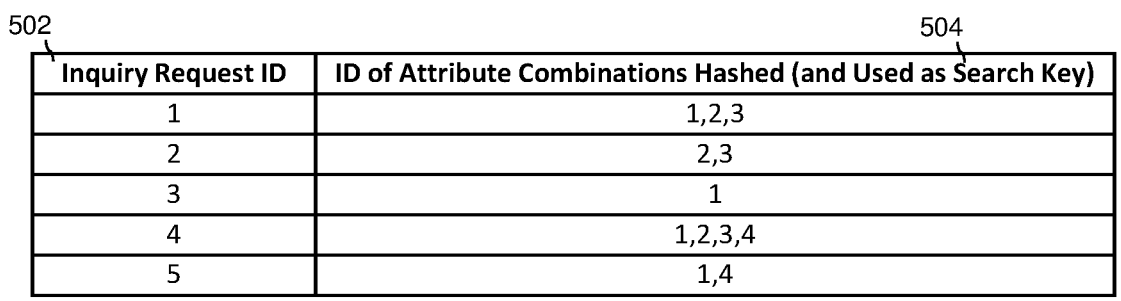
FIG. 5 is a table that schematically represents aspects of exemplary inquiries and associated predetermined hash combinations used in a method, implemented using the system shown in FIG. 1, to store and find information about entity behavior using a blockchain network according to aspects of the invention.

The server computer 102 includes a hash generator 110 which applies a one-way mathematical hashing function to each predefined entity attribute group 404 (e.g., one of the available attribute combinations 400) provided as part of an inquiry request (aspects of which are shown schematically, for example, in table 500 of FIG. 5). According to aspects of the invention, with additional reference to FIG. 5, the hash generator 110 generates for each inquiry 502, a group of hashes, each representing one of the predetermined set of attribute combinations 400. Each inquiry hash is a secure, scrambled representation of an attribute combination. It is noted that, by applying the hashing function to several entity attributes (either individually or in various combinations), multiple inquiry hashes (e.g., search keys) 504 can be made.

The server computer 102 includes Ledger Search Module (LSM) 112 that searches the ledger 108 using the inquiry hashes 110 as search keys 504. The server computer 102 includes Candidate Report Identifier (CRI) 114 that compiles, for a given search inquiry, lists of reports from the ledger 108 having hashes 608 (shown, for example in table 600 of FIG. 6) that match inquiry hashes 504 used as search keys by LSM 112. As shown with additional reference to FIG. 6, the reports 600 are referenced by a Report ID 602 and include various details including a report source 604, a report timestamp 604, an activity being reported 606, and a predetermined combination of attributes hashed together 608. According to aspects of the invention, candidate reports 602 are reports selected from the entries stored in the blockchain network ledger 108 containing at least one report hash 608 that matches an inquiry hash 504 used as a search key. Candidate reports 602, accordingly, may refer to a predetermined entity of interest, the behavior of which is of interest to a user. Due to the nature of cryptographic hashes, it is noted that the term, "match" as applied herein to describe the similarity of hashes indicates a 100% resemblance of one hash when compared to another.

Even though matches according to the present are based on 100% resemblances, it is noted that some matched entity attributes 304 may be relevant to many entities, while other matched entity attributes are relevant to only a relatively few entities (or, in some cases, to only one entity). To accommodate this variation, the sever computer 102 includes Candidate Report Rating Module (CRRM) 116 that provides an Entity Matching Confidence Rating (EMCR) 118 to each candidate report. The EMCRs 118 each represent the likelihood that a given candidate report 602 (seen with additional reference to FIG. 6) refers, according to the judgement of a user 702, to activities of a predetermined entity of interest to the user. In particular, the CRRM 116 assigns EMCRs 118 based on which search keys (e.g., inquiry hashes) 504 match report hashes 608 in a candidate report, taken in combination with a predetermined Identification Utility Value 120 (described more fully below) assigned to each of the search keys 504 by a search requester (i.e., a user) 702. According to aspects of the invention, the EMCR 118 is the highest-value IUV 120 among all attribute combinations 402 associated with search results for a given inquiry 502. According to other aspects of the invention, the EMCR 118 is an average of all IUVs 120 associated with search results for a given inquiry 502. Other methods of establishing an EMCR 118 selected by one skilled in this field may also suffice.

As noted above, according to aspects of the invention, the hash generator 110 generates one or more inquiry hashes 504 (e.g., cryptographic hashes formed by applying a one-way hashing function (or other suitable hashing function selected by one skilled in this field)) to one or several of the predetermined entity attributes groups 404, and each hash is assigned a unitless Identification Utility Value (IUV) 120 provided by a user to indicate a user assessment of hash relevance to entity identification. The IUV 120 of the present invention accommodates variation in judgement from one user (e.g., different inquiring entities 702 shown schematically in table 700 of FIG. 7) to another regarding hash relevance, by allowing different users to assign different diagnostic weights (e.g., IUVs) 120 to the various attributes and attribute combinations 402 represented by the inquiry hashes. It is noted, for example, that a user may assign relatively-high value (e.g., 9 or 10) to unique entity attributes and attribute combinations, while assigning relatively-low values (e.g., 1 or 2) to relatively common attributes. It is noted that a suitable IUV range is 1-10, with numbers near 1 assigned to attributes combinations 402 that may be shared by many entities and numbers near 10 being assigned to attribute combinations that are considered unique or which apply only to a few entities. It is noted that other IUV ranges may be selected according to the judgment of one skilled in this field. It is also noted the different users 702 may attribute different IUVs 120 to the same attribute combination 402. It is also noted that a user 702 may choose to assign the same IUV 120 to more than one attribute combination 402.

Due to the possible variation in Entity Matching Confidence Ratings (EMCR) 118 across candidate reports, the server computer 102 includes Candidate Report Assurance Evaluator (CRAE) 122 that generates (as will be described more fully below) list of "high assurance" candidate reports 602 each having an EMCR 118 above a predetermined assurance threshold. According to the judgment of the user 702 that established the applied IUVs 120, reports 602 that have an EMCR 118 above the assurance threshold contain hashes of attribute combinations 402 having sufficient relevance to entity identification utility (e.g., are unique enough) to directly (e.g., without any additional, corroborating information) establish that a certain predefined entity is being referenced in a given high assurance report. According to aspects of the invention, high assurance reports 602 are gathered in a list and sent to a user interface 124 for possible access by a user 702 or stored for further processing. According to aspects of the invention, a suitable value for the assurance threshold is 8, although other values may be selected in accordance with the judgment of one skilled in this field.

Not all candidate reports (e.g., reports with hashes of entity attribute combinations 402 matched by search keys 504) match on hashes of with a high enough IUV 120 (e.g., have an EMCR 118 above the predetermined assurance threshold) to establish that activity of a certain predetermined entity of interest to the user 702 is being referenced the report. The server computer 102 includes Supplemental Information Module (SIM) 126 that obtains, for candidate reports 602 with a confidence rating below the assurance threshold, from an information source 128 (e.g., a report source 604) additional information to help confirm the identity the entity associated with the action 608 being described in the report 602. It is noted that the additional information can vary from scenario to scenario and should not include an exchange of information unique to the entity being referenced in the report. It is also noted that the SIM 126 may also obtain additional information for reports having an EMCR 118 above the assurance threshold.

Now with reference to continued reference to FIG. 1 and with additional reference to FIG. 2, a method to store and find information about entity behavior using a blockchain network using the system shown in FIG. 2 will now be described. The server computer 102 receives, at block 202 from entity attribute source 106 (e.g., an entity looking to conduct a transaction with the user 702 or other source suitable to provide the information requested), a set of attributes 304 associated with a predetermined entity.

The server computer 102, in response to receiving the set of entity attributes 304, groups the attributes into (where possible, based on information provided by the information source 106) predetermined attribute combinations 404 and forwards the groups of attributes to hash generator 110, which applies a hashing function (e.g., a one-way function) to each of the forwarded combinations. The hash generator 110 providing a set of inquiry hashes, including one inquiry hash 504 for each combination forwarded.

At block 206, the server computer 102 receives access to blockchain ledger 108 that includes at least one report (aspects of which are shown schematically in table 600 of FIG. 6), that include hashed representations (e.g., a report hash) of entity attributes for parties that have undertaken prior activity activities which may be of interests to the user 702. According to aspects of the invention, the blockchain entries are entered into the blockchain ledger by a report source 604 (e.g., an entity having information about activity associated with various entities). According to aspects of the invention, the report source 604 will have applied the same hashing function (e.g., one-way function) as applied by hash generator 110 to entity attribute combinations 608 selected from the same predetermined attribute combinations 404 available to users 702 making search inquiries (e.g., ledger look up requests, like those shown schematically in table 500) about prior activities of predetermined entities within the blockchain ledger 108.

At block 208, the server computer 102, via ledger search module 112, searches the blockchain ledger 108 records using the inquiry hashes (shown schematically in table 500 of FIG. 5) as search keys. According to aspects of the invention, the inquiry hashes contain scrambled representations of grouped entity attributes 404. For example, as shown in FIG. 5, a search inquiry identified as Inquiry Request 1 includes a set of three hashed attribute combinations 404. In particular, Inquiry Request 1 includes a hash of attribute combination 1 (i.e., hashes of attributes 1, 2, 3, and 4), a hash of attribute combination 2 (i.e., hashes of attributes 1, 2, and 3), and a hash of attribute combination 3 (i.e., hashes of attributes 1 and 2). Similarly, Inquiry Request 2 includes a hash of attribute combination 2 and a hash of attribute combination 3. Inquiry Request 3 includes a hash of attribute combination 1. Inquiry Request 4 includes a hash of attribute combination 1, attribute combination 2, attribute combination 3, and a hash of attribute combination 4. Inquiry Request 5 includes a hash of attribute combination 1 and a hash of attribute combination 4. In operation, when search module 112 conducts a ledger look up based on a selected inquiry (for example, based on Inquiry Request 5—attribute combinations 1 and 4) the search module compares the hashes of combination 1 and combination 4 (e.g., uses them as search keys) with all those present in the blockchain ledger reports (shown schematically in table 600), and processing continues in block 210.

The server computer 102, at block 210, via candidate report identifier 122, generates a list of reports with any hashes that match inquiry hashes 504. The list indicates which inquiry hashes were matched. More particularly, the candidate report identifier 122 compares and the hashes contained in reports in the blockchain ledger 108. During use, as the server computer 102 searches the ledger 108 to find matches for search keys associated with entity attribute combination 1 and combination 4, the candidate report identifier 122 will find matches in attribute combination 1 in Report 1, Report 2, and Report 3, and these three reports will be listed as candidate reports by the candidate report identifier. No matches should be found for attribute combination 4.

The server computer 102, via Candidate Report Rating Module (CRRM) 116 at block 212 assigns an Entity Matching Confidence Rating (EMCR) 118 to each candidate report. The EMCRs 118 are based on predetermined Identification Utility Values 120 provided by the user (or some other appropriate source), each associated with one of the hashed attribute combinations 404 available for use as a search key 504. According to aspects of the invention, the CRRM indicates a likelihood of a given report pointing to a predetermined entity of interest to a user 702 (e.g., referenced in the search keys 504). As seen in table 700, different users 702 (e.g., inquiring entities) may assign different IUV 120 to each of the predetermined attribute combinations available for use to generate search keys 504.

The server computer 102, via Candidate Report Assurance Evaluator (CRAE) 122, at block 214, generates list of "high assurance" candidate reports having EMCRs above the assurance threshold (e.g., 8 or other value selected by one skilled in this field). All the candidate reports are passed to decision block 216, where the server computer 102 forwards high assurance reports to block 220 for presentation via user interface 124. According to aspects of the invention, the report source 604 is notified of the search request.

The server computer 102 identifies candidate reports with EMCRs that do not exceed the assurance threshold as "low assurance" reports, and the low assurance reports are forwarded to Supplemental Information Module (SIM) 126 at block 218. The SIM 126 obtains, from an information source 128 (e.g., a report source 604), additional information about an associated report entity. The server computer 102 then forwards this information, along with the associated low assurance report to user interface 124 for possible access by a user 702 or stored for further processing. It is noted that the SIM 126 can increase the user confidence in the likelihood of a particular candidate report identifying the behavior of a predetermined entity. It is noted that the SIM 126 may also obtain additional information for reports with high assurance values, if desired. It is also noted that, according to aspects of the invention, the SIM 126 need not obtain additional information for all low assurance reports. It is also noted that embodiments of the invention allow the SIM 126 to obtain (or to not obtain) additional information at the direction of a user (e.g., as provided via user interface 124), regardless of report EMCR value.

It is noted that, according to aspects of the invention, notifying the report source 604 of the search requests and requests for additional information is a way to maintain provenance. It is noted that aspects of the invention can increase user confidence in ledger report content, as an investigated and confirmed reports can be identified as such on the blockchain ledger 108.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
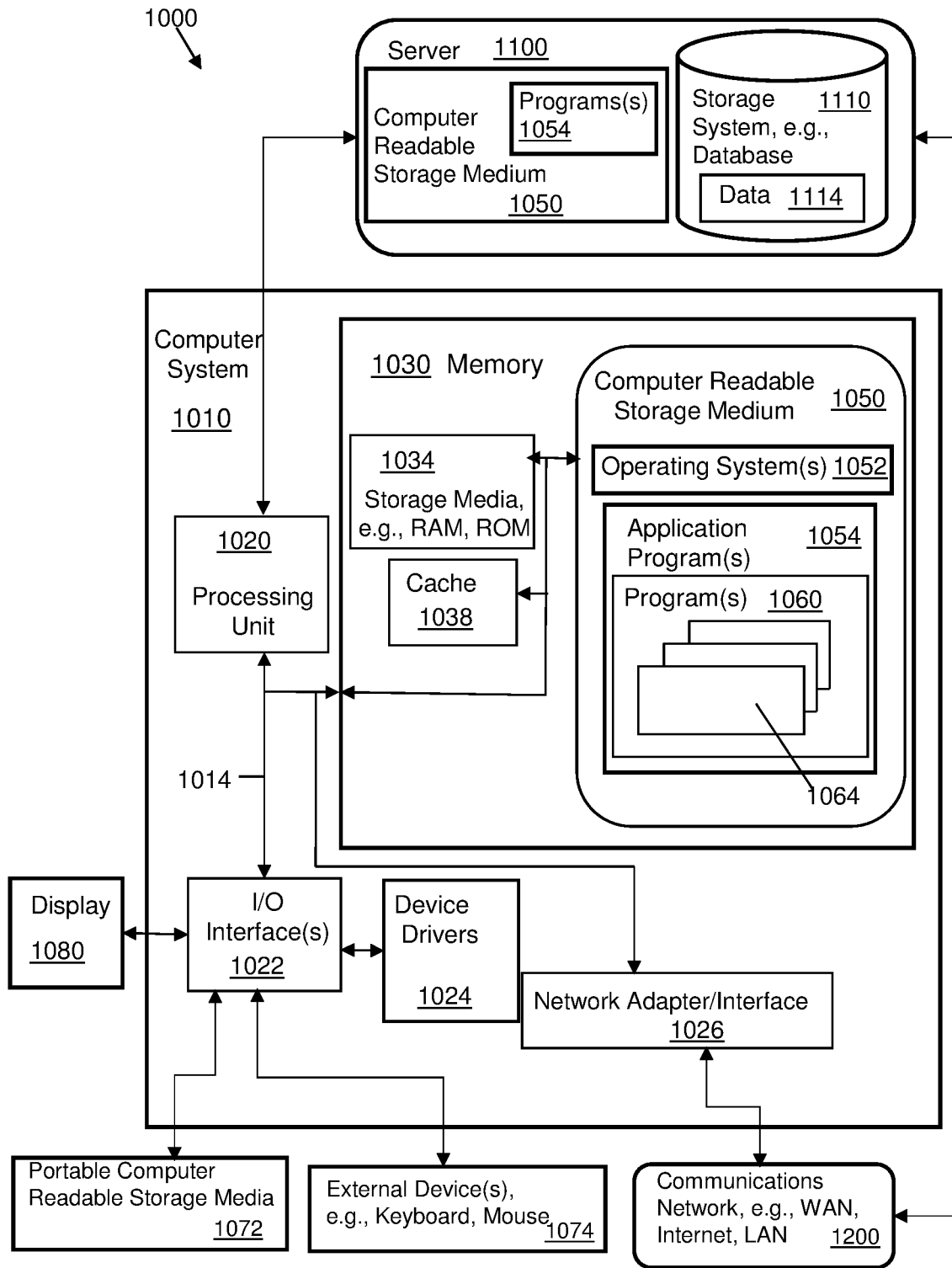
FIG. 8 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 8, a system or computer environment 1000 includes a computer diagram 1010 shown in the form of a generic computing device. The method of the invention, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
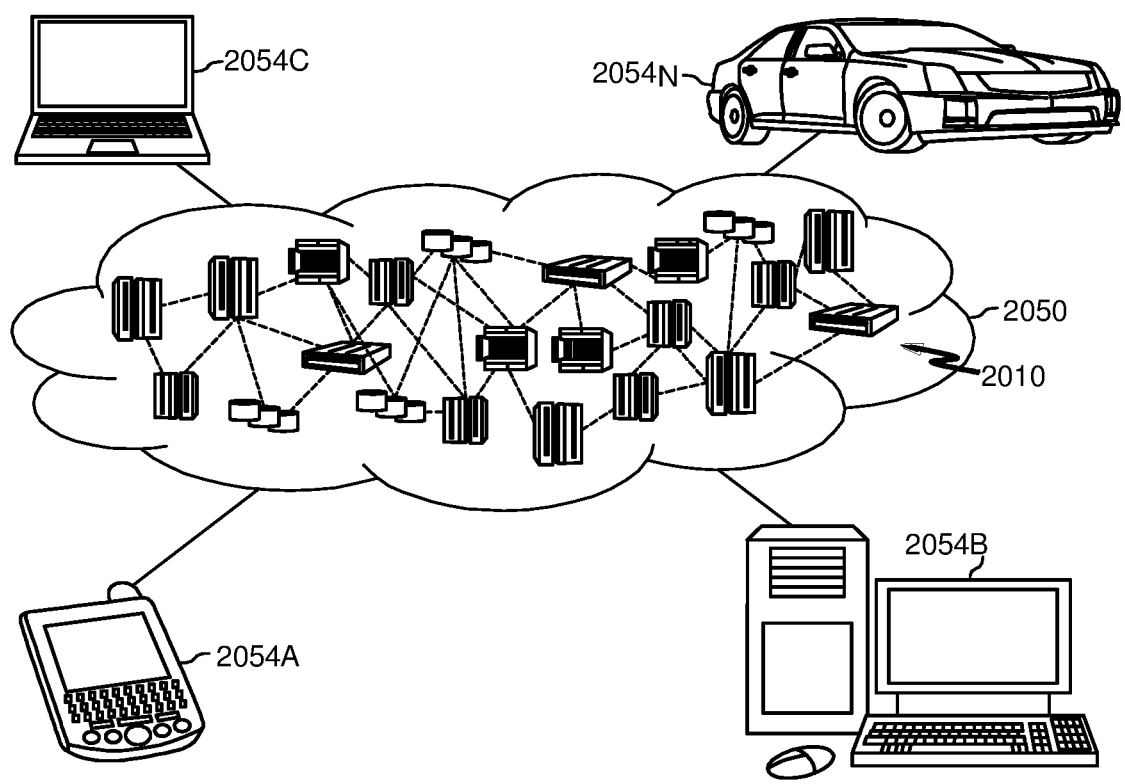
FIG. 9 depicts a cloud computing environment according to an embodiment of the present invention.

Referring now to FIG. 9, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 10:
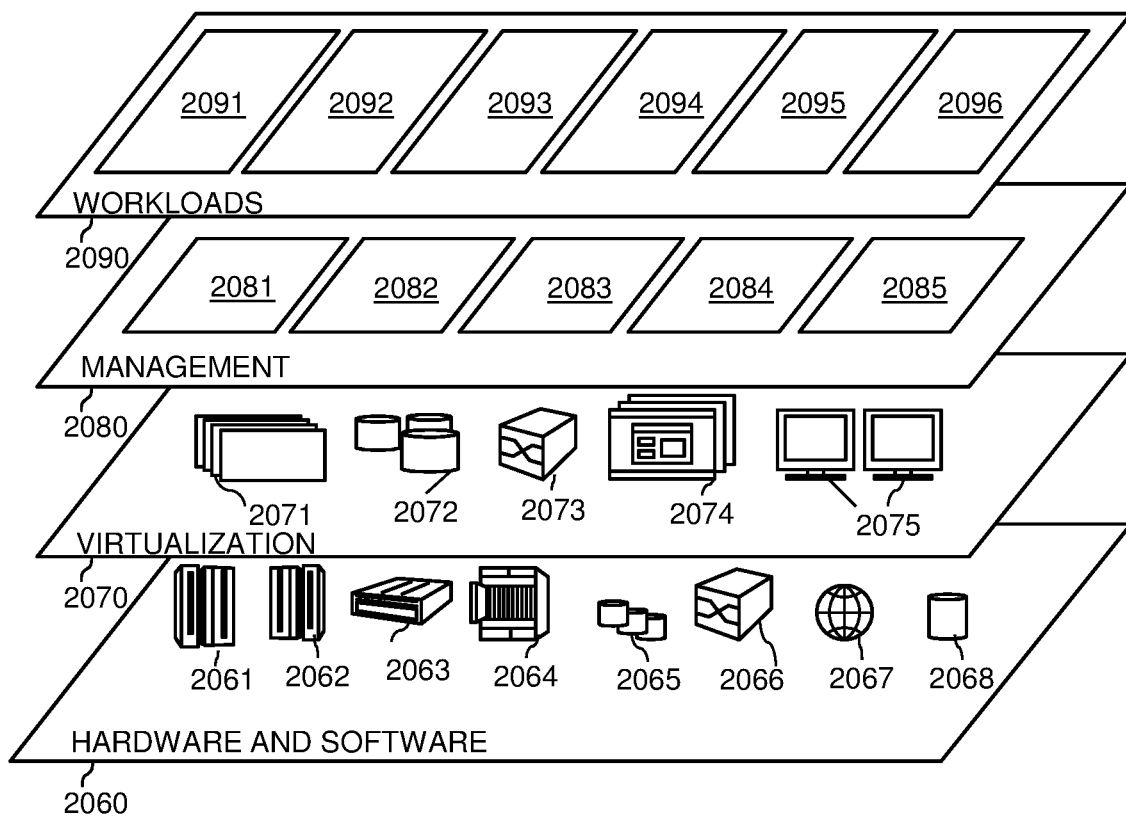
FIG. 10 depicts abstraction model layers according to an embodiment of the present invention.

Referring now to FIG. 10, a set of functional abstraction layers provided by cloud computing environment 2050 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and storing and finding information about entity behavior using a blockchain network optimizing microphone enablement in group electronic communication using data analysis 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method to analyze blockchain ledger content, comprising:
    receiving, by a computer, a set of attributes associated with a predetermined entity;
    applying a hashing function to several entity attributes either individually or in various combinations to generate multiple inquiry hashes;
    responsive to receiving said set of attributes, applying, by said computer, a one-way function to a group of said attributes to generate an inquiry hash from the multiple inquiry hashes, the inquiry hash includes scrambled representations of group entity attributes;
    receiving by said computer, access to a blockchain ledger that includes at least one report, said at least one report including at least one report hash associated with an attribute of a report entity;
    searching, by said computer, the at least one report using said inquiry hash as a search key;
    responsive to said searching, generating by the computer, a list of candidate reports that each contain at least one report hash that matches said inquiry hash;
    assigning, by said computer, an entity matching confidence rating to each of said candidate reports based, at least in part, on a predetermined identification utility value associated with said inquiry hash, said identification utility value indicating a likelihood that the report entity is the predetermined entity; and
    generating, by said computer, from among rated candidate reports, a list of high assurance reports having an entity matching confidence rating above a predetermined assurance threshold.

2. The method of claim 1, wherein, for each of said candidate reports being assigned an entity matching confidence rating having a value less than said predetermined assurance threshold, obtaining by the computer from an information source, additional information about an associated report entity; and generating a list of said additional information associated with said report entity.

3. The method of claim of 1, wherein said inquiry hash is generated from applying said one-way function to a plurality of attributes.

4. The method of claim 1, wherein said at least one report includes a plurality of report hashes.

5. The method of claim 1, wherein said computer applies said one-way function to a plurality of groups of said attributes to generate a corresponding plurality of inquiry hashes, and wherein said searching is conducted using each of said inquiry hashes as a search key.

6. The method of claim 1, wherein the inquiry hashes are made by a first entity, and said reports are generated by a second entity.

7. The method of claim 1, wherein the blockchain is a private, permissioned network.

8. The method of claim 1, wherein the entity is an individual.

9. A system to analyze blockchain ledger content, which comprises:
    a computer system comprising a computer readable storage medium having program instructions embodied therewith, the program instructions executable by a computer to cause the computer to:
    receive a set of attributes associated with a predetermined entity;
    apply a hashing function to several entity attributes either individually or in various combinations to generate multiple inquiry hashes;
    responsive to receiving said set of attributes, apply a one-way function to a group of said attributes to generate an inquiry hash from the multiple inquiry hashes, the inquiry hash includes scrambled representations of group entity attributes;
    receive access to a blockchain ledger that includes at least one report, said at least one report including at least one report hash associated with an attribute of a report entity;
    search the at least one report using said inquiry hash as a search key;
        responsive to said searching, generate a list of candidate reports that each contain at least one report hash that matches said inquiry hash;
        assign an entity matching confidence rating to each of said candidate reports based, at least in part, on a predetermined identification utility value associated with said inquiry hash, said identification utility value indicating a likelihood that the report entity is the predetermined entity; and
    generate from among rated candidate reports, a list of high assurance reports having an entity matching confidence rating above a predetermined assurance threshold.

10. The system of claim 9 wherein, for each of said candidate reports being assigned an entity matching confidence rating having a value less than said predetermined assurance threshold, obtaining by the computer from an information source, additional information about an associated report entity; and generating a list of said additional information associated with said report entity.

11. The system of claim of 9, wherein said inquiry hash is generated from applying said one-way function to a plurality of attributes.

12. The system of claim 9, wherein said at least one report includes a plurality of report hashes.

13. The system of claim 9, wherein said computer applies said one-way function to a plurality of groups of said attributes to generate a corresponding plurality of inquiry hashes, and wherein said searching is conducted using each of said inquiry hashes as a search key.

14. The system of claim 9, wherein the inquiry hashes are made by a first entity, and said reports are generated by a second entity.

15. The system of claim 9, wherein the blockchain is a private, permissioned network.

16. The system of claim 9, wherein the entity is an individual.

17. A computer program product to analyze blockchain ledger content, the computer program product comprising a computer readable storage medium having program instructions embodied therewith, the program instructions executable by a computer to cause the computer to:
    receive, using a computer, a set of attributes associated with a predetermined entity;
    apply a hashing function to several entity attributes either individually or in various combinations to generate multiple inquiry hashes;

responsive to receiving said set of attributes, apply, using the computer, a one-way function to a group of said attributes to generate, using the computer, an inquiry hash from the multiple inquiry hashes, the inquiry hash includes scrambled representations of group entity attributes;

receive, using the computer, access to a blockchain ledger that includes at least one report, said at least one report including at least one report hash associated with an attribute of a report entity;

search, using the computer, the at least one report using said inquiry hash as a search key;

responsive to said searching, generate, using the computer, a list of candidate reports that each contain at least one report hash that matches said inquiry hash;

assign an entity matching confidence rating to each of said candidate reports based, at least in part, on a predetermined identification utility value associated with said inquiry hash, said identification utility value indicating a likelihood that the report entity is the predetermined entity; and generating from among rated candidate reports, a list of high assurance reports having an entity matching confidence rating above a predetermined assurance threshold.

18. The computer program product of claim 17 wherein, for each of said candidate reports being assigned an entity matching confidence rating having a value less than said predetermined assurance threshold, obtaining by the computer from an information source, additional information about an associated report entity; and generating a list of said additional information associated with said report entity.

19. The computer program product of claim 17, wherein said computer applies said one-way function to a plurality of groups of said attributes to generate a corresponding plurality of inquiry hashes, and wherein said searching is conducted using each of said inquiry hashes as a search key.

20. The computer program product of claim 17, wherein the inquiry hashes are made by a first entity, and said reports are generated by a second entity.

* * * * *